United States Patent
Li et al.

(10) Patent No.: US 10,523,572 B2
(45) Date of Patent: Dec. 31, 2019

(54) GATEWAY-ASSISTED UNICAST-TO-MULTICAST CONVERSION FOR ADAPTIVE BIT RATE (ABR) DATA

(71) Applicant: Avago Technologies International Sales Pte. Limited, Singapore (SG)

(72) Inventors: Yong Li, San Diego, CA (US); Xuemin Chen, Rancho Santa Fe, CA (US)

(73) Assignee: Avago Technologies International Sales Pte. Limited, Singapore (SG)

(*) Notice: Subject to any disclaimer, the term of this patent is extended or adjusted under 35 U.S.C. 154(b) by 417 days.

(21) Appl. No.: 14/950,756

(22) Filed: Nov. 24, 2015

(65) Prior Publication Data

US 2017/0134294 A1    May 11, 2017

Related U.S. Application Data

(60) Provisional application No. 62/251,244, filed on Nov. 5, 2015.

(51) Int. Cl.
| | |
|---|---|
| *H04L 12/825* | (2013.01) |
| *H04W 4/06* | (2009.01) |
| *H04L 29/06* | (2006.01) |
| *H04L 12/18* | (2006.01) |

(52) U.S. Cl.
CPC .......... *H04L 47/25* (2013.01); *H04L 12/184* (2013.01); *H04L 65/4076* (2013.01); *H04L 65/602* (2013.01); *H04L 65/604* (2013.01); *H04W 4/06* (2013.01); *H04L 12/189* (2013.01)

(58) Field of Classification Search
USPC .......................................................... 709/231
See application file for complete search history.

(56) References Cited

U.S. PATENT DOCUMENTS

| | | | |
|---|---|---|---|
| 9,774,894 B2 * | 9/2017 | Dalela ..................... H04L 65/80 |
| 2013/0132986 A1 * | 5/2013 | Mack ..................... H04L 65/605 725/14 |
| 2013/0254614 A1 * | 9/2013 | Kumar .................. H04L 1/0078 714/748 |
| 2013/0268986 A1 * | 10/2013 | Venkatachalam ........................... H04N 21/2365 725/109 |
| 2014/0282777 A1 * | 9/2014 | Gonder ................. H04L 65/605 725/109 |
| 2015/0288617 A1 * | 10/2015 | Dasher .................. H04L 47/801 709/226 |
| 2016/0119791 A1 * | 4/2016 | Koskinen .............. H04W 48/08 455/454 |

* cited by examiner

*Primary Examiner* — Hermon Asres
(74) *Attorney, Agent, or Firm* — Foley & Lardner LLP (57) ABSTRACT

A method of processes data such as video information. The method includes providing a request from a gateway to an adaptive bit rate server for a unicast adaptive bit rate stream and converting by the gateway the unicast adaptive bit rate stream into one or more multicast adaptive bit rate streams. The gateway is in communication with user equipment having security paired client devices. The method further includes receiving link conditions between the security paired client devices and the user equipment from the user equipment. The method also includes adapting using the gateway the unicast adaptive bit rate stream in response to the link conditions.

20 Claims, 7 Drawing Sheets

GATEWAY-ASSISTED UNICAST-TO-MULTICAST CONVERSION FOR ADAPTIVE BIT RATE (ABR) DATA

CROSS-REFERENCE TO RELATED APPLICATIONS

This application claims the benefit of and priority to U.S. Provisional Application No. 62/251,244, entitled "Gateway-Assisted Unicast-to-Multicast Conversion for Adaptive Bit Rate (ABR) Data," filed Nov. 5, 2015, which is hereby incorporated by reference herein in its entirety.

FIELD

The present disclosure relates generally to the field of communications, including, but not limited to, unicast-to-multicast communications.

BACKGROUND

Current cellular systems, such as Long Term Evolution (LTE) systems, use a licensed spectrum or band for wireless transmissions. Devices in an LTE network employ a feature called carrier aggregation (CA) to enable high data rates by communicating across multiple channels in the licensed band. Licensed assisted access (LAA) LTE formerly known as LTE-U (or unlicensed LTE) generally makes use of an unlicensed band or spectrum (i.e., a spectrum not reserved for a particular company, network, etc.). Wireless local area network (WLAN) frequency bands are generally unlicensed for use by LTE devices. LTE transmissions in the unlicensed spectrum can address spectrum shortage issues in the licensed or LTE band. LAA-LTE-capable devices or user equipment (UE) can access a macro cell using a licensed band and access an LAA-LTE-capable small cell via both a licensed band and an unlicensed band.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

A. Computing and Network Environment

Figure 1A:
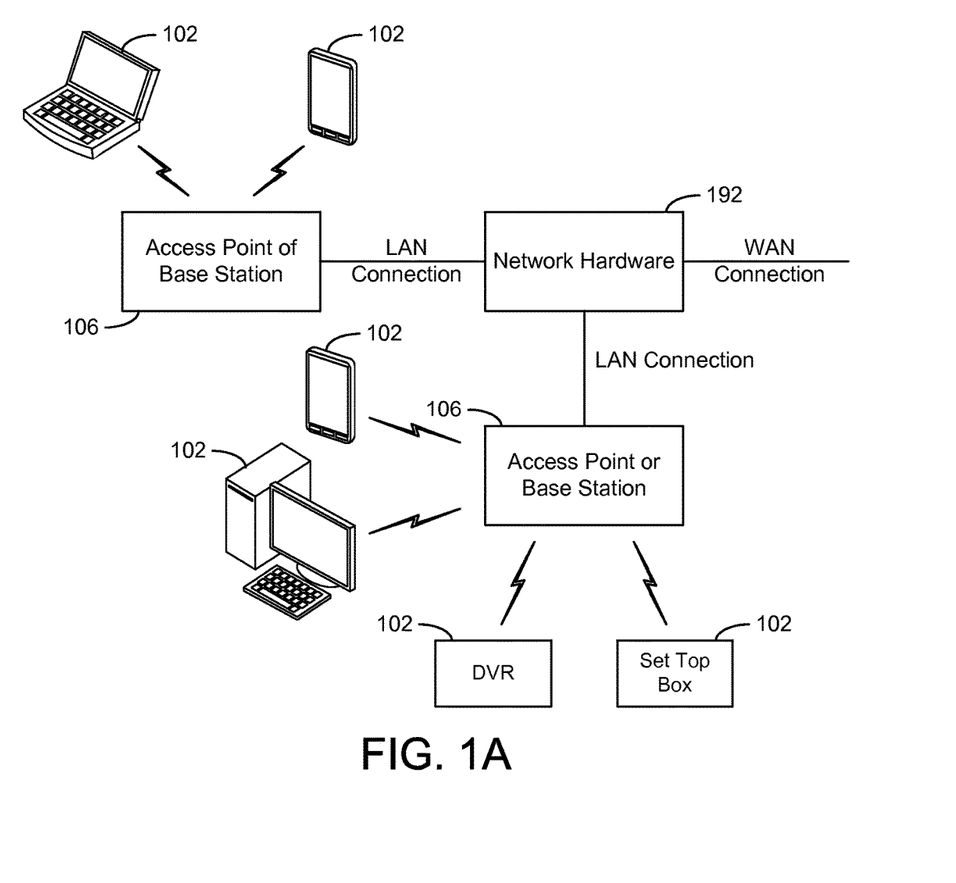
FIG. 1A is a general block diagram depicting an embodiment of a network environment including one or more wireless communication devices in communication with one or more devices or stations.

Prior to discussing specific embodiments of the present solution, aspects of the operating environment as well as associated system components (e.g., hardware elements) are described in connection with the methods and systems described herein. Referring to FIG. 1A, an embodiment of a network environment is depicted. In brief overview, the network environment includes a wireless communication system that includes one or more base stations 106, one or more wireless communication devices 102 and a network hardware component 192. The wireless communication devices 102 can for example include laptop computers 102, tablets 102, personal computers 102, set top boxes 102, digital video recorders (DVRs) 102 and/or cellular telephone devices 102. The details of an embodiment of each wireless communication device 102 and/or base station 106 are described in greater detail with reference to FIGS. 1B and 1C. The network environment can be an ad hoc network environment, an infrastructure wireless network environment, a subnet environment, etc., in one embodiment.

Terms such as "wireless communication device," "user equipment," "mobile station," "mobile," "mobile device," "subscriber station," "subscriber equipment," "access terminal," "terminal," "handset," and similar terminology, can refer to a wireless device utilized by a subscriber or user of a wireless communication service to receive or convey data, control, voice, video, sound, gaming, or substantially any data-stream or signaling-stream. The foregoing terms can be utilized interchangeably in the present disclosure. Likewise, terms such as "small cell," "access point (AP)," "wireless access point (WAP)," "base station," "base transceiver station," "Node B," "evolved Node B (eNode B or eNB)," home Node B (HNB)," "home access point (HAP)," and similar terminology, can be utilized interchangeably in the present disclosure, and refer to a wireless network component or apparatus that serves and receives data, control, voice, video, sound, gaming, or substantially any data-stream or signaling-stream from a set of wireless devices.

Referring again to FIG. 1A, the base stations 106 can be operably coupled to the network hardware component 192 via local area network connections. The network hardware component 192, which can include a router, gateway, switch, bridge, modem, system controller, appliance, etc., can provide a local area network connection for the communication system. Each of the base stations 106 can have an associated antenna or an antenna array to communicate with the wireless communication devices 102 in its area. The wireless communication devices 102 can register with a particular access point or base station 106 to receive services from the communication system (e.g., via a SU-MIMO or MU-MIMO configuration). For direct connections (e.g., point-to-point communications), some wireless communication devices 102 can communicate directly via an allocated channel and communications protocol. Some of the wireless communication devices 102 can be mobile or relatively static with respect to the access point or base station 106. Some of the wireless communication devices 102 (e.g., set top boxes, digital video recorders) can be connected via a wired connection (e.g., Ethernet connection) to the network hardware component 192 in some embodiments.

In some embodiments, the base station 106 includes a device or module (including a combination of hardware and software) that allows wireless communication devices 102 to connect to a wired network using an LTE network, a wireless local area network using one or more of the 802.11 standards (WiFi), an LAA LTE network, and/or a network operating according to other standards. The base station 106 can be implemented, designed and/or built for operating in a WLAN and in a cellular network. The base station 106 can connect to a router (e.g., via a wired network) as a stand-alone device in some embodiments. In other embodiments, the base station 106 can be a component of a router. The base station 106 can provide multiple devices 102 access to a network. The base station 106 can, for example, connect to a wired Ethernet connection and provide wireless connections using radio frequency links for other devices 102 to utilize that wired connection. The base station 106 can be built and/or implemented to support a standard for sending and receiving data using one or more radio frequencies. Those standards and the frequencies they use can be defined by the IEEE or 3GPP for example. The base station 106 can be implemented and/or used to support cellular coverage, public Internet hotspots, and/or on an internal network to extend the network's signal (e.g., Wi-Fi) range.

In some embodiments, the base stations 106 can be used for (e.g., in-home or in-building) wireless networks (e.g., IEEE 802.11, Bluetooth®, ZigBee, cellular, any other type of radio frequency based network protocol and/or variations thereof). Each of the wireless communication devices 102 can include a built-in radio and/or is coupled to a radio. Such wireless communication devices 102 and/or base stations 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more of the base stations 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
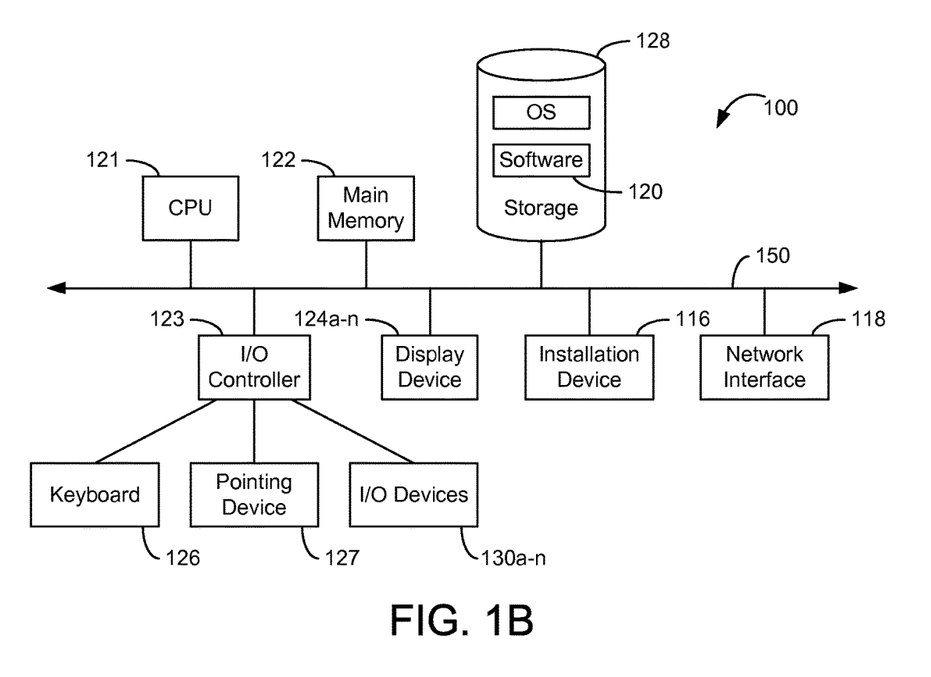
FIGS. 1B and 1C are general block diagrams depicting embodiments of computing devices useful in connection with the methods and systems described herein.
Figure 1C:
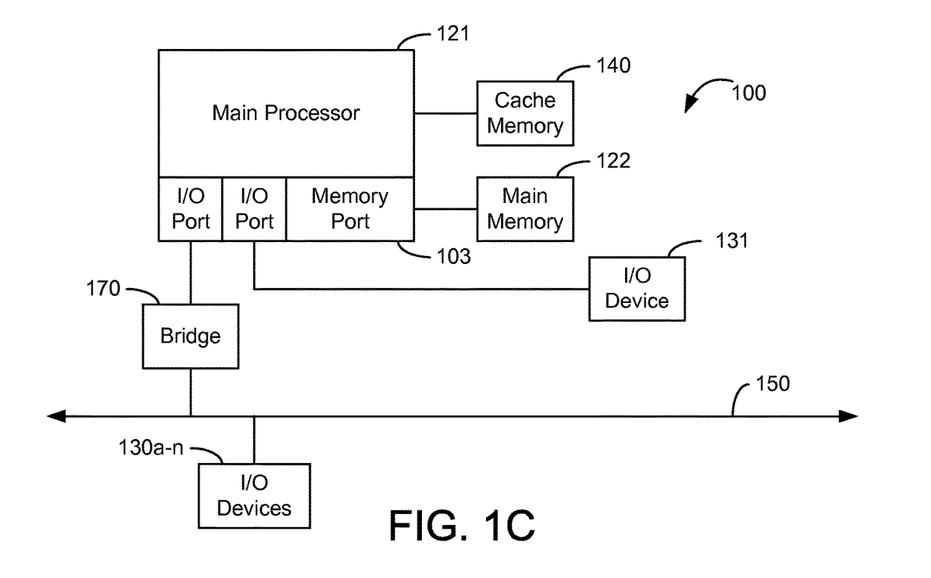

The communications device(s) 102 and the base station(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or the base station 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include, without limitation, an operating system and/or software. As shown in FIG. 1C, each computing device 100 can also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; those manufactured by ARM Holdings, plc of Cambridge, England. or those manufactured by Advanced Micro Devices of Sunnyvale, Calif. The computing device 100 can be based on any of these processors, or any other processor capable of operating as described herein.

Main memory unit 122 can be one or more memory chips capable of storing data and allowing any storage location to be directly accessed by the central processing unit 121, such as any type or variant of Static random access memory (SRAM), Dynamic random access memory (DRAM), Ferroelectric RAM (FRAM), NAND Flash, NOR Flash and Solid State Drives (SSD). The main memory unit 122 can be based on any of the above described memory chips, or any other available memory chips capable of operating as described herein. In the embodiment shown in FIG. 1B, the central processing unit 121 communicates with main memory unit 122 via a system bus 150 (described in more detail below). FIG. 1C depicts an embodiment of a computing device 100 in which the processor communicates directly with main memory unit 122 via a memory port 103. For example, in FIG. 1C the main memory unit 122 can be DRDRAM.

FIG. 1C depicts an embodiment in which the central processing unit 121 (e.g., the main central processing unit) communicates directly with cache memory 140 via a secondary bus, sometimes referred to as a backside bus. In other embodiments, the central processing unit 121 communicates with cache memory 140 using the system bus 150. Cache memory 140 typically has a faster response time than main memory unit 122 and is provided by, for example, SRAM, BSRAM, or EDRAM. In the embodiment shown in FIG. 1C, the central processing unit 121 communicates with various I/O devices 130a-n via a local system bus or system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the central processing unit 121 can use an Advanced Graphics Port (AGP) to communicate with the display 124. FIG. 1C depicts an embodiment of a computing device 100 in which the central processing unit 121 can communicate directly with I/O device 130*b*, for example via HYPERTRANSPORT, RAPIDIO, or INFINI-BAND communications technology. FIG. 1C also depicts an embodiment in which local busses and direct communication are mixed: the central processing unit 121 communicates with I/O device 130*a* using a local interconnect bus while communicating with I/O device 131 directly.

A wide variety of I/O devices 130*a-n* and 131 can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices 130*a-n* can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation device 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax, LTE, LTE-A, LAA-LTE and direct asynchronous connections). In one embodiment, the computing device 100 communicates with other computing devices via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124*a*-124*n*. As such, any of the I/O devices 130*a*-130*n* and/or the I/O controller 123 can include any type and/or form of suitable hardware, software, or combination of hardware and software to support, enable or provide for the connection and use of the display device(s) 124*a*-124*n* by the computing device 100. For example, the computing device 100 can include any type and/or form of video adapter, video card, driver, and/or library to interface, communicate, connect or otherwise use the display device(s) 124*a*-124*n*. In one embodiment, a video adapter can include multiple connectors to interface to the display device(s) 124*a*-124*n*. In other embodiments, the computing device 100 can include multiple video adapters, with each video adapter connected to the display device(s) 124*a*-124*n*. In some embodiments, any portion of the operating system of the computing device 100 can be implemented for using multiple display devices 124*a*-124*n*. One ordinarily skilled in the art will recognize and appreciate the various ways and embodiments that a computing device 100 can be implemented to have one or more display devices 124*a*-124*n*.

In further embodiments, an I/O device 130*a-n* can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, telephone, sensor, desktop computer, laptop or notebook computer, server, handheld computer, mobile telephone, or other portable telecommunications device, set top box, digital video recorder, media playing device, a gaming system, mobile computing device, or any other type and/or form of computing, telecommunications or media device that is capable of communication. The computing device 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Gateway Assisted Unicast-to-Multicast Conversion for Adaptive Bit Rate (ABR) Data In some embodiments, systems and/or methods perform unicast-to-multicast conversion for adaptive bit rate data using LAA LTE or LTE U. Although described below with respect to LAA LTE communications, the unicast-to-multicast conversion can be used in other types of networks (e.g., LTE, Multimedia over Coax Alliance (MoCA), and WiFi networks) or in accordance with other communication standards in some embodiments. LAA LTE is sometimes referred to as LTE-unlicensed (LTE-U), LTE for unlicensed spectrum, or LAA using LTE over unlicensed, and any these terms may be used interchangeably in this disclosure.

Unicast data (e.g., video) associated with one or more programs (e.g., video programs) is provided to a user via an LAA-LTE small cell gateway or other network in some embodiments. In some embodiments, the macro cell and small cell base stations access an evolved packet core (EPC) via backhaul links through broadband access networks (e.g. microwave, cable, DSL, fiber, etc.). The unicast data is provided to user equipment which redirects the watched video program simultaneously to multiple client devices that are capable of receiving the downlink channel in the LAA-LTE domain in some embodiments.

In some embodiments, the LAA-LTE device or user equipment performs a procedure to discover the client devices in the same coverage area and identifies the content rights for discovered devices. Based on the result of the discovery and content-right identification, the user equipment performs the security pairing with each discovered client and downloads the service data for the paired devices from the network service controller in some embodiments. The service data indicates the service profile and device capabilities of each client (e.g. eligibility for various video programs, video processing and display capabilities, etc.) in some embodiments. Using an application on the user equipment, the user invokes an application on the small cell gateway so that the small cell gateway starts to request a unicast adaptive bit rate stream from the adaptive bit rate video server in some embodiments. The initial adaptive bit rate requests are based on the conditions of the links between the user equipment and the small cell gateway and between the small cell gateway and the adaptive bit rate video server in some embodiments. The user equipment application also informs the small cell gateway about the internet protocol (IP) multicast address assigned to the requested video stream in some embodiments. Once the small cell gateway receives unicast adaptive bit rate stream packets from the adaptive bit rate video server, the small cell gateway converts the unicast adaptive bit rate stream into a multicast adaptive bit rate stream by replacing the unicast destination internet protocol address in the received adaptive bit rate packets with the multicast internet protocol address assigned by the user equipment in some embodiments. The small cell gateway transmits the multicast adaptive bit rate stream in the supplementary downlink channel on the unlicensed band in some embodiments. Using the user equipment application, the user selects to redirect the multicast stream to one or multiple security-paired client devices in some embodiments. A trigger command is subsequently sent to each of the selected client devices using the WiFi or Bluetooth backlink, which in turn sends the user equipment an internet protocol join (JOIN) multicast message to join the multicast group indicated in the trigger command in some embodiments. This allows all selected client devices that have joined the multicast group to receive the transmitted video program in some embodiments.

For a given video content stream requested by the LAA-LTE user equipment, each discovered client device is assigned a given multiple multicast group according to the commonality and difference of the client device's content rights with the rest of the discovered client devices in some embodiments. Accordingly, the LAA-LTE user equipment triggers the client device to join a given multicast group, and the small cell gateway transmits the multicast adaptive bit rate streams associated with each discovered client in the supplementary downlink channel on the unlicensed band in some embodiments.

In some embodiments, the disclosure is related a method of processing video information. The method includes providing a request from a gateway to an adaptive bit rate server for a unicast adaptive bit rate stream and converting by the gateway the unicast adaptive bit rate stream into one or more multicast adaptive bit rate streams. The gateway is in communication with user equipment having security paired client devices. The method further includes receiving link conditions between the security paired client devices and the user equipment from the user equipment. The method also includes adapting using the gateway the unicast adaptive bit rate stream in response to the link conditions.

In some embodiments, the disclosure is related to a method of processing video information. The method includes performing security pairing of a first device with a plurality of client devices, identifying the content rights associated with the client devices, assigning a client device to a multicast group, and causing a gateway to request a unicast adaptive bit rate stream. The method also includes receiving one or more multicast adaptive bit rate streams converted from the unicast adaptive bit rate stream from the gateway by using the first application to redirect the multicast adaptive rate bit streams to a downlink channel in an unlicensed band for receipt by the client devices in the multicast group.

In some embodiments, the disclosure is related circuits, processors or combinations thereof configured to provide the methods of processing video information discussed above. In some embodiments, the disclosure is related gateways, video servers, user equipment and/or access points configured to provide the video information discussed above.

In some embodiments, the disclosure is related a gateway configured for communication with a user equipment having security paired client devices. The gateway includes a processor, a circuit, or combination thereof configured to provide a request to an adaptive bit rate server for a unicast adaptive bit rate stream and convert the unicast adaptive bit rate stream into one or more multicast adaptive bit rate streams. The processor, circuit or combination thereof is also configured to receive link conditions between the security paired client devices and the user equipment from the user equipment, and adapt the unicast adaptive bit rate stream according to the link conditions.

Figure 2:
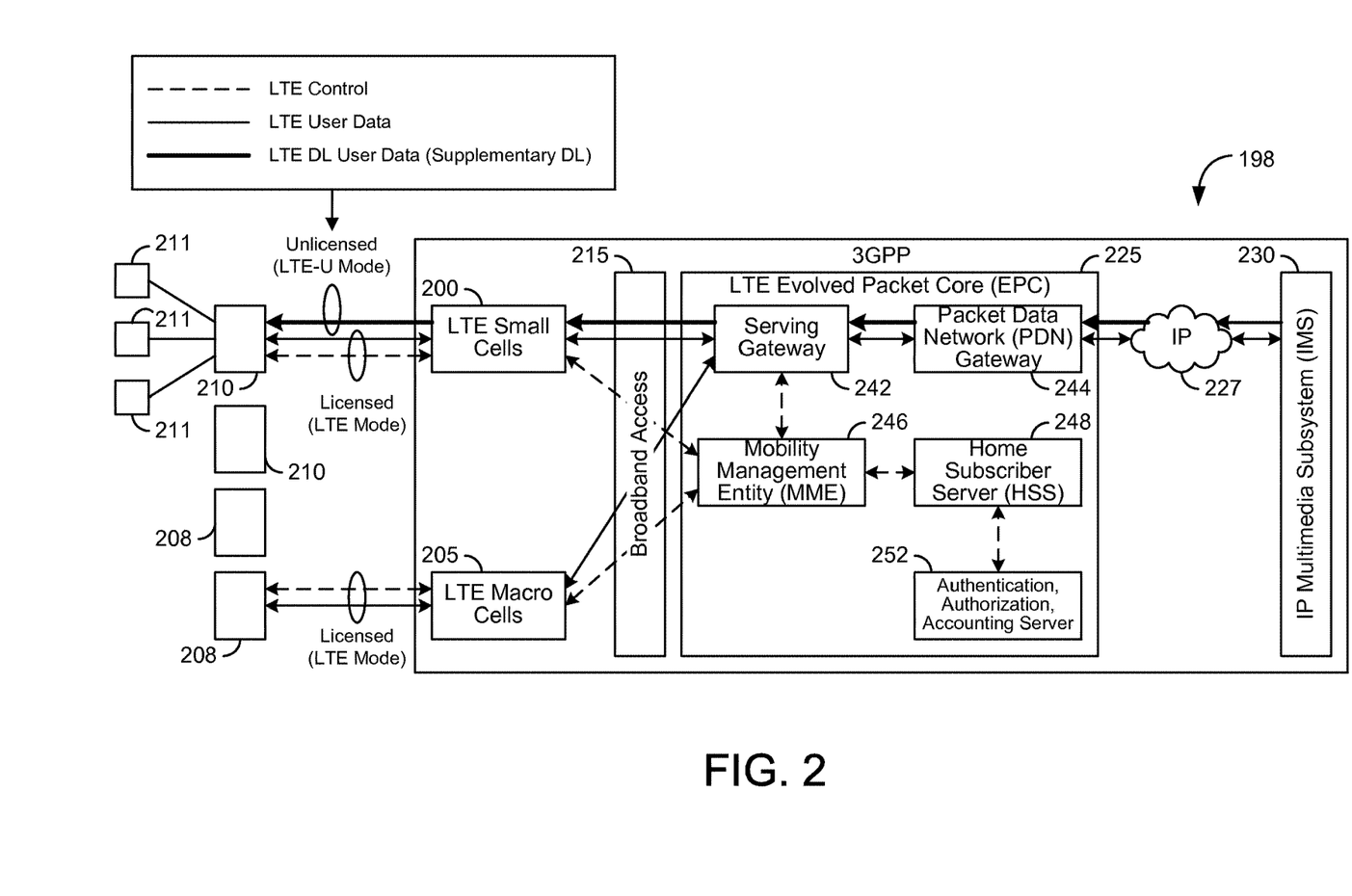
FIG. 2 is a general block diagram of a communication system including user equipment and small cells using LAA-LTE in accordance with some embodiments.

Referring to FIG. 2, a network or communication system 198 is utilized to convert a unicast communication to a multicast communication for consumption in some embodiments. The communication system 198 includes one or more small cells 200, one or more macro cells 205, an access network 215, a packet core 225, a network 227 (e.g., an internet protocol network), and a multimedia subsystem (IMS) 230. The one or more small cells 200 and macro cells 205 are in communication with a number of devices 208 and 210 (e.g., UE). The macro cells 205 are optional parts of the communication system 198 in some embodiments.

The small cells 200 are implementable in an environment, such as, an office, commercial or residential building, school, or any other type of environment in which devices 208 and 210 connect wirelessly. The devices 210 can be in communication with one or more client devices 211. The small cells 200 are configured to communicate with the various devices 208 and 210 by providing a network incorporating a variety of standards. For example, some devices 210 communicate with the small cell 200 via LAA LTE, and other devices 208 communicate with the small cell 200 via LTE, 802.11n WiFi or 802.11ac WiFi. In some embodiments, the devices 208 communicate with the macro cells 205 via LTE, and the devices 210 communicate with the small cells 200 via LAA LTE (e.g., using unlicensed and licensed channels). It should be understood that the present disclosure can be adapted to accommodate a number of communication protocols for a number and variety of the devices 208 and 210 and the small cells 200.

The small cell 200 can be any of devices 102 or base stations 106 in FIG. 1A, and the devices 208 and 210 can be any of devices 102 in FIG. 1A in some embodiments. The client devices 211 can be similar or identical to the devices 210 and are any type of device for receiving data including but not limited to set top boxes, cellular phones, televisions, monitors, lap top computers, notebook computers, tablet computers, desktop computers, video recorders, video players, etc. The client devices 211 include storage and/or display screens in some embodiments. In some embodiments, the device 210 is a video gateway (e.g., WiFi video gateway) and the client devices 211 are televisions, set top boxes or digital video recorders.

The communication system 198 is utilized to convert a unicast communication to a multicast communication for consumption by the client devices 211 in some embodiments. The small cells 200 communicate LTE user data and LTE control data with the devices 210 using the LTE licensed band according to the LTE standard and communicate LTE down link (DL) user data (e.g., supplementary downlink data) with the devices 210 using the unlicensed channel according to the LAA LTE standard in some embodiments. The small cells 200 and macro cells 205 communicate with the access network 215. The access network 215 is a broadband access network (e.g., cable, digital subscriber line, fiber optic, etc.) in some embodiments.

The packet core 225 is an LTE evolved packet core (EPC) and is disposed between the network 227 and the access network 215. The network 227 is an internet protocol network in communication with the multimedia subsystem 230 which is an internet protocol multimedia subsystem in some embodiments. The multimedia subsystem 230 is a computer server which is responsible for the media session setup and maintenance of media related applications. The multimedia subsystem 230 can store content, such as audio and video data, in some embodiments.

The packet core 225 includes a serving gateway 242, a mobility management entity (MME) 246, a packet data network (PDN) gateway 244, a home subscriber server (HSS) 248, and an authentication, authorization, and accounting server 252. The serving gateway 242 is an interface for communications with the small cells 200 and the macro cells 205 via the access network 215. The serving gateway 242 is in communication with the packet data network (PDN) gateway 244 and the access network 215 in some embodiments. The serving gateway 242 is under control of the mobility management entity 246 in some embodiments. The mobility management entity 246 is a computer server or module in some embodiments. The home subscriber server 248 and the authentication authorization, and accounting server 252 are computer servers in some embodiments. The serving gateway 242 terminates user data planes of the small cells 200 and the macro cells 205 in some embodiments. The mobility management entity 246 terminates the control planes of the macro cells 205 and the small cells 200 in some embodiments. The home subscriber server 248 provides service control and a user database for the mobile network in some embodiments. The home subscriber server 248 provides service control and maintains user databases associated with the devices 208, 210 and/or 211 in some embodiments. The authentication, authorization, and accounting server 252 performs authentication, authorization, and accounting for the communication system 198 in some embodiments.

The packet data network gateway 244 configures media sessions and maintains media-related applications in some embodiments. The packet data network gateway 244 is an interface between the serving gateway 242 and the network 227. The packet data network gateway 244 receives data from the serving gateway 242 and packetizes the data for the network 227 and receives data from the network 227 and configures the data for reception by the serving gateway 242 in some embodiments.

Figure 3:
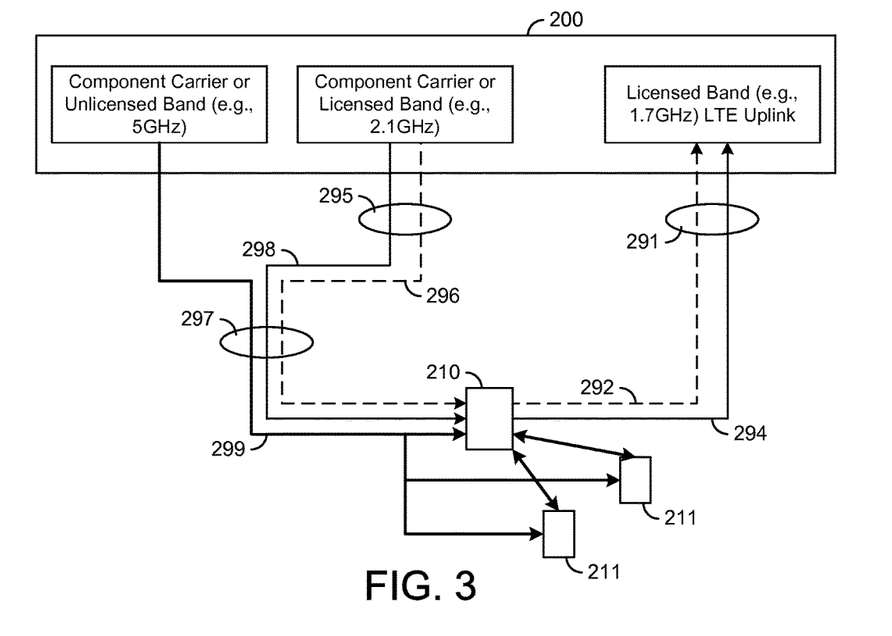
FIG. 3 is a general block diagram of the user equipment illustrated in FIG. 2 using downlink carrier aggregation in accordance with some embodiments.

Referring to FIG. 3, the communication system 198 uses downlink carrier aggregation in some embodiments. The device 210 communicates with the small cell 200 using an uplink 291 including a control uplink 292 in the licensed band (e.g., component carrier in the licensed band (e.g., 1.7 GHz)) and a voice and quality of service (QOS) sensitive data uplink 294 in the licensed band (e.g., component carrier in the licensed band (e.g., 1.7 GHz)) in some embodiments. The device 210 communicates with the small cell 200 using a downlink 295 including a control downlink 296 in the licensed band (e.g., component carrier in the licensed band (e.g., 1.7 GHz)) and a voice and quality of service sensitive data downlink 298 in the licensed band (e.g., component carrier in the licensed band (e.g., 1.7 GHz)) in some embodiments. The device 210 communicates with the small cell 200 using a supplementary data down link 299 in the unlicensed band (e.g., component carrier in the unlicensed band (e.g., 5 GHz)) for best efforts data in some embodiments. The carrier aggregation using downlinks 295 and 299 of an aggregated downlink 297 advantageously achieves high data rates and supports frequency division duplex (FDD) and time division duplex (TDD) formats in some embodiments. In some embodiments, a multicast communication is advantageously provided to the client devices 211 using the downlink 299 in the unlicensed band.

Figure 4:
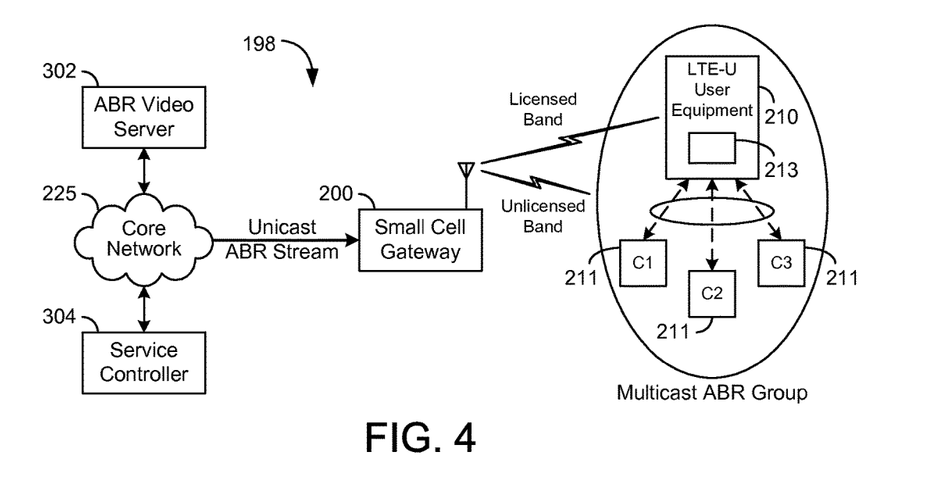
FIG. 4 is a general block diagram of the user equipment and one of the small cells illustrated in FIG. 2 engaged in a unicast-to-multicast communication in accordance with some embodiments.

Referring to FIG. 4, the communication system 198 is configured for unicast to multicast conversion that provides data to the client devices 211 in communication with the device 210. The device 210 communicates with the small cell 200 via LAA LTE using the uplink 291, the downlink 295 and the downlink 299 (FIG. 3). The small cell 200 receives a unicast adaptive bit rate stream from the packet core 225 which is in communication with an adaptive bit rate server 302 and a service controller 304. The adaptive bit rate server 302 is a computer video server. The service controller 304 is a network service controller module operating on a server or other computing platform in some embodiments. In some embodiments, the adaptive bit rate server 302 and the service controller 304 are part of the multimedia subsystem 230, the home subscriber server 248, the mobility management entity 246, and/or the authentication, authorization, and accounting server 252 (FIG. 2). The unicast adaptive bit rate stream is converted to a multicast adaptive bit rate stream for receipt by the client devices 211 on the downlink 299 (FIG. 3). In some embodiments, a video program watched on the device 210 can be simultaneously watched on the client devices 211.

The device 210 includes a module or application 213 for requesting a unicast adaptive bit rate stream. The application 213 responds to a user request when requesting the unicast adaptive bit stream in some embodiments. The application 213 can present a user menu or guide with selections of video programs in some embodiments. The application 213 can be implemented in one or more of the PHY, media access control or logical link control (LLC) layers of the device 210 in some embodiments. In some embodiments, the application 213 is a software routine executed by a processor associated with the device 210.

Figure 5:
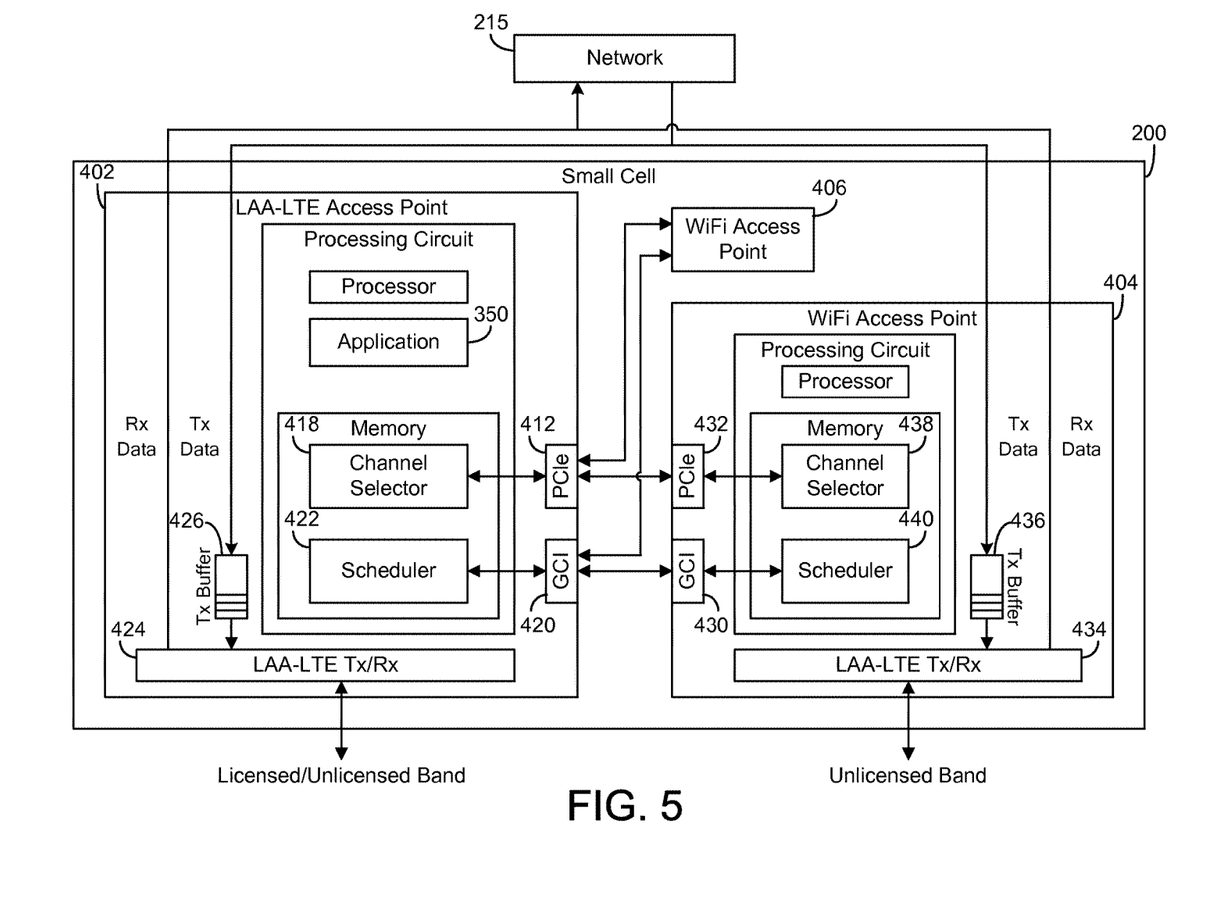
FIG. 5 is a more detailed block diagram of one of the small cells illustrated in FIG. 2 in accordance with some embodiments.

Referring to FIG. 5, the small cell 200 includes a LAA LTE access point 402 and WiFi access points 404 and 406 in some embodiments. LAA LTE access point 402 is communicably coupled to the pair of WiFi access points 404, 406. While in the present disclosure a small cell 200 is described with a LAA LTE access point and two WiFi access points, various other configurations of the small cell 200 are possible. For example, in some embodiments, small cell 200 includes only LAA LTE access point 402, or LAA access point 402 in combination with only one of WiFi access points 404 and 406.

LAA LTE access point 402 includes an application 350 for responding to the application 213 (FIG. 4) of the device 210 in some embodiments. The application 350 is a module or program that effects communication of the unicast adaptive bit rate program for viewing on the client devices 211 and the device 210 via the downlink 299 (FIG. 3) in some embodiments. The application 350 is configured to convert the unicast bit stream into a multicast bit stream for consumption by the client devices 211 in some embodiments. The application 350 can be implemented in one or more of the PHY, media access control or logical link control (LLC) layers of the small cell 200.

Only one WiFi access point 404 is shown in detail for space considerations; in some embodiments, WiFi access point 406 includes the same or similar components as the access point or base station 106. LAA LTE access point 402 is coupled with the WiFi access points 404, 406 via a UART-based general circuit interface (GCI) interface 420, 430 and a Peripheral Component Interconnect Express (PCIe) interface 412, 432 in some embodiments. GCI interface 420, 430 is configured to carry real-time critical signals and messages, and PCIe interface 412, 432 is configured to carry non-real-time communications between the access points 402, 404 in some embodiments. Each access point 402, 404 is shown to generally include a transmitter/receiver circuit 424, 434 for transmitting and receiving data, and a buffer 426, 436 for receiving data. LAA LTE access point 402 further includes a channel selector 418 and scheduler 422, and WiFi access points 404, 406 further include a channel selector 438 and scheduler 440.

The access points 402, 404 are further shown to include a processing circuit including a processor and memory. The memories are shown to include channel selector 418 and 438, and the schedulers 422 and 440. In some embodiments, the memories further include other modules for controlling the activities of their respective access points. In some embodiments, the processors are, or include, one or more microprocessors, application specific integrated circuits (ASICs), circuits containing one or more processing components, a group of distributed processing components, circuitry for supporting a microprocessor, or other hardware configured for processing. The processors are configured to execute computer code stored in memory to complete and facilitate the activities described herein including the activities of the application 350 in some embodiments. The memories are any volatile or non-volatile computer-readable storage medium capable of storing data or computer code relating to the activities described herein. For example, the memories are shown to include modules which are computer code modules (e.g., executable code, object code, source code, script code, machine code, etc.) configured for execution by the processor. According to some embodiments, the processing circuits may represent a collection of processing devices (e.g., servers, data centers, etc.). In such cases, the processors represent the collective processors of the devices and the memories represent the collective storage devices of the devices. When executed by the processors, the processing circuits are configured to complete the activities described herein. In some embodiments, the channel selectors 418 and 438 and/or schedulers 422 and 440 may be implemented outside of the memory (e.g., using hardware-based circuitry).

Referring to FIGS. 3, 4, 5 and 6, the device 210 and the small cell 200 utilize a flow 500 to effect redirection of a unicast video stream in some embodiments. As a user watches a video program on the device 210 transmitted as unicast adjustable bit rate video via the LTE—the small cell 200, the user redirects the watched video program simultaneously to multiple client devices 211 that are capable of receiving the downlink 299 on a channel in the unlicensed band in some embodiments.

Figure 6:
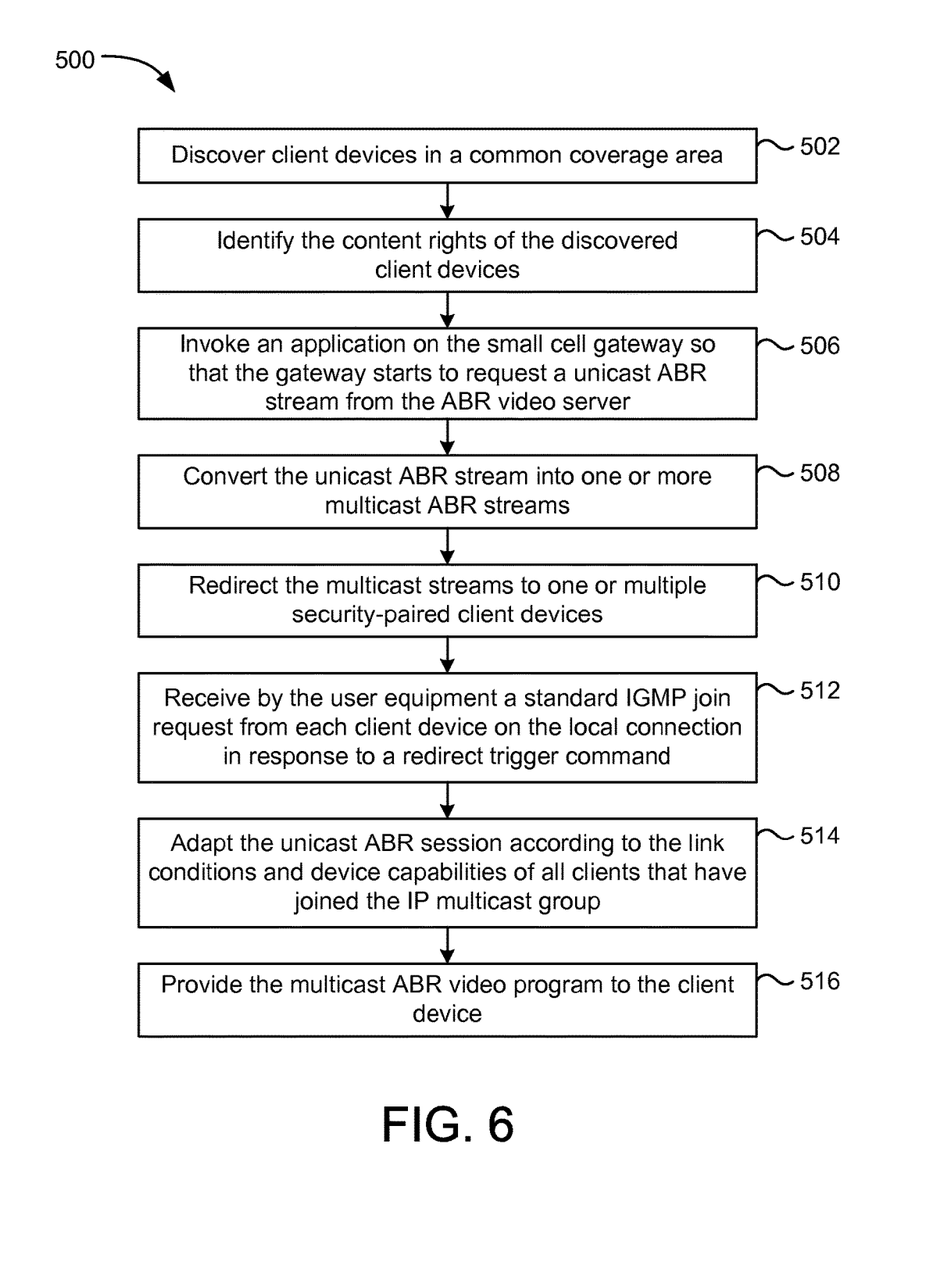
FIG. 6 is an operational flow diagram depicting unicast-to-multicast operations for the user equipment and one of the small cells illustrated in FIG. 2 in accordance with some embodiments.

At an operation 502, the device 210 performs a procedure to discover the client devices 211 in the same coverage area. This procedure can be based on, for example, WiFi or Bluetooth discovery or linking procedures. Based on the result of the operation 502, the device 210 performs the security pairing with each discovered client device 211. Various procedures can be used to perform security pairings. In some embodiments, the device 210 establishes a local connection with the client devices 211 using a Wi-Fi/Bluetooth transceiver. For example, the device 210 can transmit Bluetooth low energy (BLE) advertiser messages, and/or beacon signals/messages, via the Wi-Fi/Bluetooth transmitter to advertise that it can facilitate configuring a supplementary downlink channel for the client devices 211. The client devices 211 receive the advertiser message and initiate a local connection with the device 210, which can be established by the Wi-Fi/Bluetooth transceiver of the device 210. In some embodiments, the local connection can be point-to-point (e.g. Bluetooth, Wi-Fi Direct, etc.) and/or the local connection can be facilitated by a local controller (e.g. a Wi-Fi access point). The client devices 211 authenticate themselves to the device 210 by running an authentication process over the local connection. In some embodiments, the authentication process can be based on public-key cryptography, and/or a shared secret between the devices 210, 211. Upon successful authentication, a secure channel is established between the devices 210, 211 via the local connection in some embodiments.

At an operation 504, the device 210 downloads the service data for the paired client devices 211 from the service controller 304. The service data indicates the service profile and device capabilities of each client device 211 (e.g. eligibility for various video programs, video processing and display capabilities, etc.) in some embodiments. In some embodiments, the service data includes audio quality preference or capability, video quality capability or preference, ratings eligibility for the client device 211, video format capability or preference, payment and billing information, etc. In some embodiments, the service data includes content rights of each of the client devices 211.

At an operation 506, the application 213 on the small cell 200 is used to invoke an application 350 on the small cell 200 so that the small cell 200 starts to request a unicast adaptive bit rate stream from the adaptive bit rate server 302. The initial adaptive bit rate requests are based on the conditions of the links between the device 210 and the small cell 200 and between the small cell 200 and the adaptive bit rate server 302. The application 213 also provides the small cell 200 information about the multicast address assigned to the requested video stream. The multicast address is an internet protocol address and corresponds to the client devices 211 in some embodiments. Particular client devices 211 can be selected or approved for the multicast stream based upon content rights or other service data.

At an operation 508, the small cell 200 receives the unicast adaptive bit rate data (e.g., the video stream packets) from the adaptive bit rate server 302 and converts the unicast adaptive bit rate data communication into a multicast adaptive bit rate communication (e.g., stream). In some embodiments, the small cell 200 replaces the unicast destination address (e.g., internet protocol address) in the received adaptive bit rate packets with the multicast address assigned by the device 210 in response to the application 350. The small cell 200 transmits the multicast adaptive bit rate stream in the supplementary downlink 299 on the unlicensed band in some embodiments.

Using the application 213, the user selects to redirect the multicast stream to one or multiple security-paired client devices 211 at an operation 510 in some embodiments. A trigger command is subsequently sent to each of the selected client devices 211 using the WiFi or Bluetooth backlink, which in turn sends the device 210 an internet protocol multicast JOIN message (e.g., using internet group management protocol (IGMP)) to join the multicast group indicated in the trigger command at an operation 512. This allows all selected client devices 211 that have joined the multicast group to receive the transmitted video program in some embodiments.

The small cell 200 continuously monitors the link conditions with all the client devices 211 in the internet protocol multicast group in some embodiments. The small cell 200 adapts the adaptive bit rate requests to the adaptive bit rate server 302 according to the link conditions at an operation 514 in some embodiments. The dynamic link conditions can be reported by the client devices 211 to the device 210 in the format of their own adaptive bit rate requests, which in turn forwards them to the small cell 200 in some embodiments.

For the case of secured adaptive bit rate content, the small cell 200 performs the necessary security handshakes with the adaptive bit rate server 302. The small cell 200 also performs any necessary trans-crypt operations between the unicast adaptive bit rate security with the adaptive bit rate server 302 and the multicast digital rights management (DRM) over the LAA LTE wireless interface to provide the adaptive bit rate program to the client devices 211 at an operation 516 in some embodiments.

Figure 7:
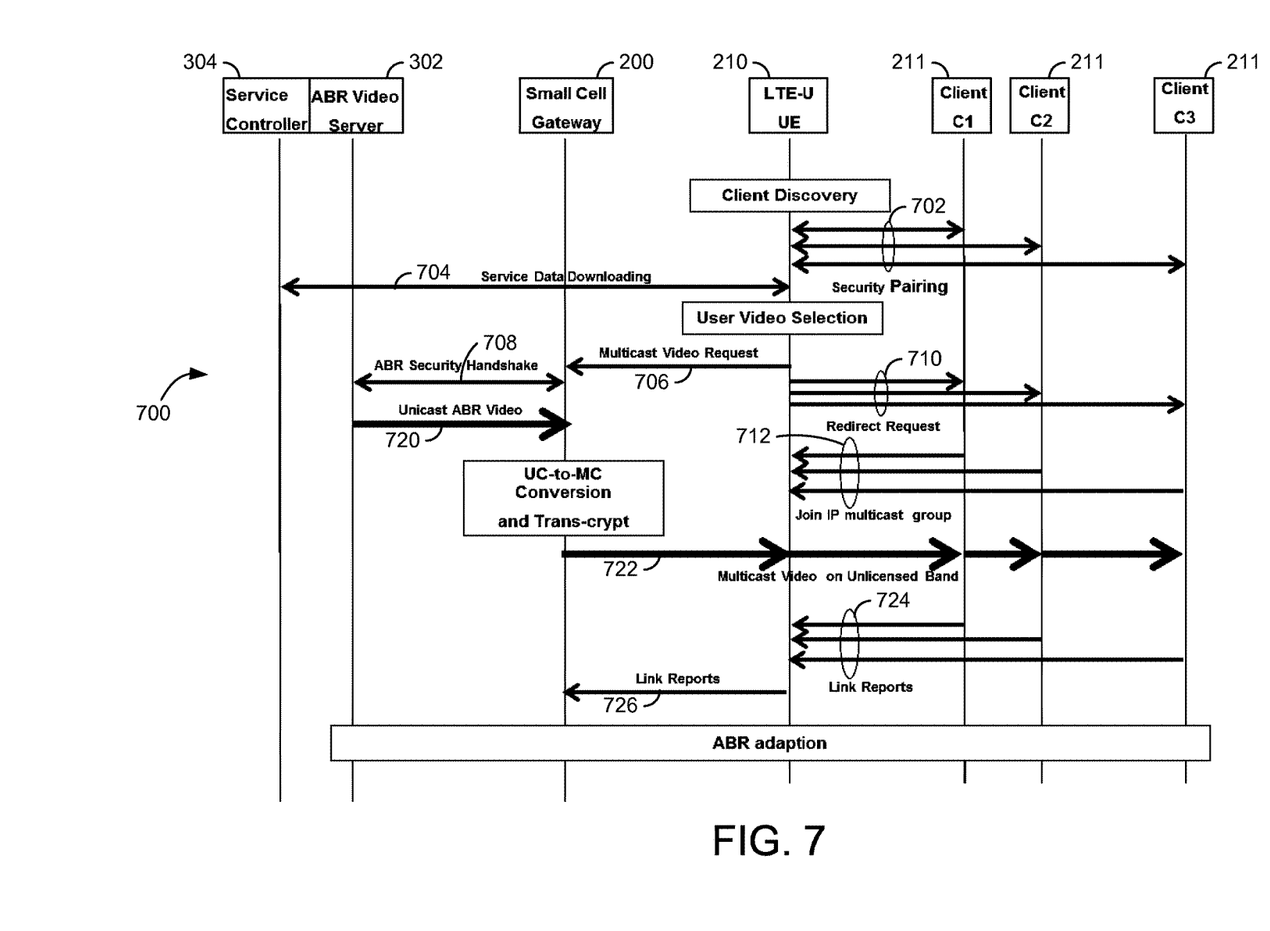
FIG. 7 is a communication flow diagram depicting a unicast-to-multicast communication flow for the user equipment and one of the small cells illustrated in FIG. 2 in accordance with some embodiments.

Referring to FIG. 7, a diagram 700 shows the provision of a unicast adaptive bit rate video to three client devices 211. The device 210 communicates with the client devices 211 in the same coverage area. The device 210 performs the security pairing with each discovered client device 211 using communications 702 in some embodiments. The device 210 downloads from the service controller 304 the service data and device capabilities for all discovered client devices 211 in a communication 704 in some embodiments. Using the application 213 (FIG. 4) on the device 210, the user selects a video and invokes the application 350 (FIG. 5) on the small cell 200 so that the small cell 200 starts to request a unicast adaptive bit rate stream from the adaptive bit rate server 302 using a communication 706 to the small cell 200 in some embodiments. The device 210, using the application 213, also informs the small cell 200 about the internet multicast address assigned to the requested video stream in some embodiments. Upon receiving a redirect trigger command on the local WiFi or Bluetooth connection via communications 710, each client device 210 sends a standard internet group management protocol join request to the device 210 using communications 712, with the join request indicating the multicast IP address of the streamed video program which is included in the trigger command provided by the device 210.

The small cell 200 performs an adaptive bit rate handshake with the adaptive bit rate server 302 using a communication 708 and receives the unicast adaptive bit rate data in a communication 720. The small cell 200 converts the unicast adaptive bit rate stream into a multicast adaptive bit rate stream by replacing the unicast destination IP address in the received adaptive bit rate packets with the multicast IP address assigned by the device 210 in some embodiments. The small cell 200 transmits the multicast adaptive bit rate stream in the supplementary downlink 299 (FIG. 3) (e.g., a channel on the unlicensed band) in a communication 722. Using the application 213 in the device 210, the user selects to redirect the multicast stream to one or multiple security-paired client devices 211 that are eligible for receiving the program video according to the downloaded service data. The same unicast adaptive bit rate stream is advantageously accessed by client devices 211 via the LAA LTE downlink (e.g., downlink 299 (FIG. 4)) without the adaptive bit rate stream being duplicated for each client device 211 in some embodiments. The client devices 211 are not required to access the licensed band to receive the adaptive bit rate stream in some embodiments. The device 210 receives link reports from the client devices 211 via communications 724 and provides the link reports to the small cell 200 via a communication 726 in some embodiments.

The small cell 200 adapts the unicast adaptive bit rate session according to the link conditions and device capabilities of all client devices 211 that have joined the internet protocol multicast group in some embodiments. The small cell 200 continuously monitors the link conditions with all members in the IP multicast group, and adapts the adaptive bit rate requests accordingly in some embodiments. The dynamic link conditions can be reported by the client devices 211 to the device 210 in the format of their own adaptive bit rate requests, which in turn forwards them to the small cell 200 in some embodiments. The device 210 also tracks the membership changes of the internet protocol multicast group, and report the link conditions of the dynamic membership to the small cell 200, so that the small cell 200 can adapt the adaptive bit rate requests accordingly in some embodiments. All selected clients 211 that have joined the multicast group are able to receive the multicast adaptive bit rate video program in some embodiments.

Although the disclosure might reference one or more "users", such "users" can refer to user-associated devices, for example, consistent with the terms "user" and "multi-user" typically used in the context of a MU-MIMO environment. Although examples of communications systems described above can include devices and access points operating according to an IEEE 802.11, 3GPP, LAA LTE or LTE standard, it should be understood that embodiments of the systems and methods described can operate according to other standards and use wireless communications devices other than devices implemented as devices and base stations. For example, communication interfaces associated with cellular networks, satellite communications, vehicle communication networks, 802.11 and other non-802.11 wireless networks can utilize the systems and methods described herein to achieve improved overall capacity and/or link quality without departing from the scope of the systems and methods described herein.

It should be noted that certain passages of this disclosure can reference terms such as "first" and "second" in connection with devices, arrays, direction, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method of processing video information, the method comprising:
  requesting, by a gateway from an adaptive bit rate server a unicast adaptive bit rate stream, wherein the gateway is in communication with user equipment associated with security paired client devices, wherein the request is based on first link conditions between the user equipment and the gateway and second link conditions between the gateway and the adaptive bit rate server;
  converting, by the gateway, the unicast adaptive bit rate stream into one or more multicast adaptive bit rate streams, by replacing a destination address of the unicast adaptive bit rate stream;
  receiving, by the gateway from the user equipment, third link conditions between the security paired client devices and the user equipment, the third link conditions including a display resolution of the security paired client devices; and
  adapting, by the gateway, the unicast adaptive bit rate stream according to the third link conditions;
  wherein the converting comprises replacing a unicast destination internet protocol address in the unicast adaptive bit rate stream with a multicast internet protocol address assigned by the user equipment for each multicast adaptive bit rate stream; and
  wherein the gateway comprises a first application invoked by a second application of the user equipment to provide the request.

2. The method of claim 1, wherein the one or more multicast adaptive bit rate streams are provided in a supplementary downlink channel in an unlicensed band.

3. The method of claim 2, wherein the gateway comprises an LAA-LTE capable small cell.

4. The method of claim 3, wherein the user equipment comprises an LAA-LTE capable smart phone, tablet or mobile computer.

5. A method of processing video information, comprising:
  performing security pairing of a first device with a plurality of client devices;
  identifying content rights associated with the plurality of client devices;
  assigning one or more client devices to a multicast group, wherein the multicast group comprises the first device;
  causing a gateway to request a unicast adaptive bit rate stream from an adaptive bit rate server, wherein the gateway is in communication with the multicast group and configured to convert the unicast adaptive bit rate stream to one or more multicast adaptive bit rate streams and provide the one or more multicast adaptive bit rate streams to the first device, wherein the request being provided according to first link conditions between the multicast group and the gateway and second link conditions between the gateway and the adaptive bit rate server;
  receiving, by the first device, the one or more multicast adaptive bit rate streams from the gateway;
  redirecting, by using a first application on the first device, the one or more multicast adaptive bit rate streams to a downlink channel in an unlicensed band for receipt by the one or more client devices in the multicast group by causing the gateway to replace a destination address of the unicast adaptive bit rate stream;
  causing the gateway to adapt the unicast multicast adaptive bit rate stream according to third link conditions between the one or more client devices and the first device, the third link conditions including a display resolution of the one or more client devices;
  wherein a unicast destination internet protocol address in the adaptive bit rate stream is replaced with a multicast internet protocol address assigned by the first device for each multicast adaptive bit rate stream; and wherein the first device uses the first application on the first device to invoke a second application on the gateway to cause the gateway to provide the request.

6. The method of claim 5, further comprising receiving service data and device capabilities for the one or more client devices.

7. The method of claim 5, wherein the downlink channel is a supplementary downlink channel in the unlicensed band.

8. The method of claim 6, further comprising:
providing, by the first device, the device capabilities to the gateway for adapting the requested unicast adaptive bit rate stream.

9. The method of claim 6, further comprising:
providing, by the first device, link conditions between the first device and the client devices to the gateway for adapting the requested unicast adaptive bit rate stream.

10. The method of claim 5, wherein the gateway comprises an LAA-LTE capable small cell.

11. The method of claim 5, further comprising:
tracking membership changes of an internet protocol multicast group associated with a multicast adaptive bit stream using the first device.

12. The method of claim 5, further comprising:
providing a redirect trigger command on a Bluetooth or WiFi connection from the first device to the client devices; and
receiving a join request from the client devices in response to the redirect trigger command.

13. The method of claim 12 wherein the join request indicates the multicast internet protocol address for a multicast adaptive bit stream.

14. A gateway configured for communication with a user equipment having security paired client devices, the gateway comprising at least one processor, circuit, or combination thereof configured to:
provide a request to an adaptive bit rate server for a unicast adaptive bit rate stream, the request being provided according to first link conditions between the user equipment and the gateway and second link conditions between the gateway and the adaptive bit rate server;
convert the unicast adaptive bit rate stream into one or more multicast adaptive bit rate streams by replacing a destination address of the unicast adaptive bit rate stream;
receive third link conditions between the security paired client devices and the user equipment from the user equipment, the third link conditions including a display resolution of the security paired client devices; and
adapt the unicast adaptive bit rate stream according to the third link conditions and
wherein the processor, circuit, or combination thereof is configured to replace a unicast destination internet protocol address in the unicast adaptive bit rate stream with a multicast internet protocol address assigned by the user equipment for a multicast adaptive bit rate stream; and
wherein the gateway comprises a first application configured to be invoked by a second application of the user equipment to provide the request.

15. The gateway of claim 14, wherein the one processor, circuit, or combination thereof is configured to receive device capabilities for the security paired client devices and adapt the unicast adaptive bit rate stream according to the device capabilities.

16. The gateway of claim 14, wherein the processor, circuit, or combination thereof is configured to provide the one or more multicast adaptive bit rate streams to the security paired client devices in a supplementary downlink channel in an unlicensed band.

17. The method of claim 1, wherein the gateway comprises an LAA-LTE capable small cell.

18. The method of claim 17, wherein the user equipment comprises an LAA-LTE capable smart phone, tablet or mobile computer.

19. The method of claim 5, wherein the adaptive bit rate server is a video server.

20. The gateway 14, wherein the gateway comprises an LAA-LTE capable small cell.

* * * * *